United States Patent Office 3,074,428
Patented Jan. 22, 1963

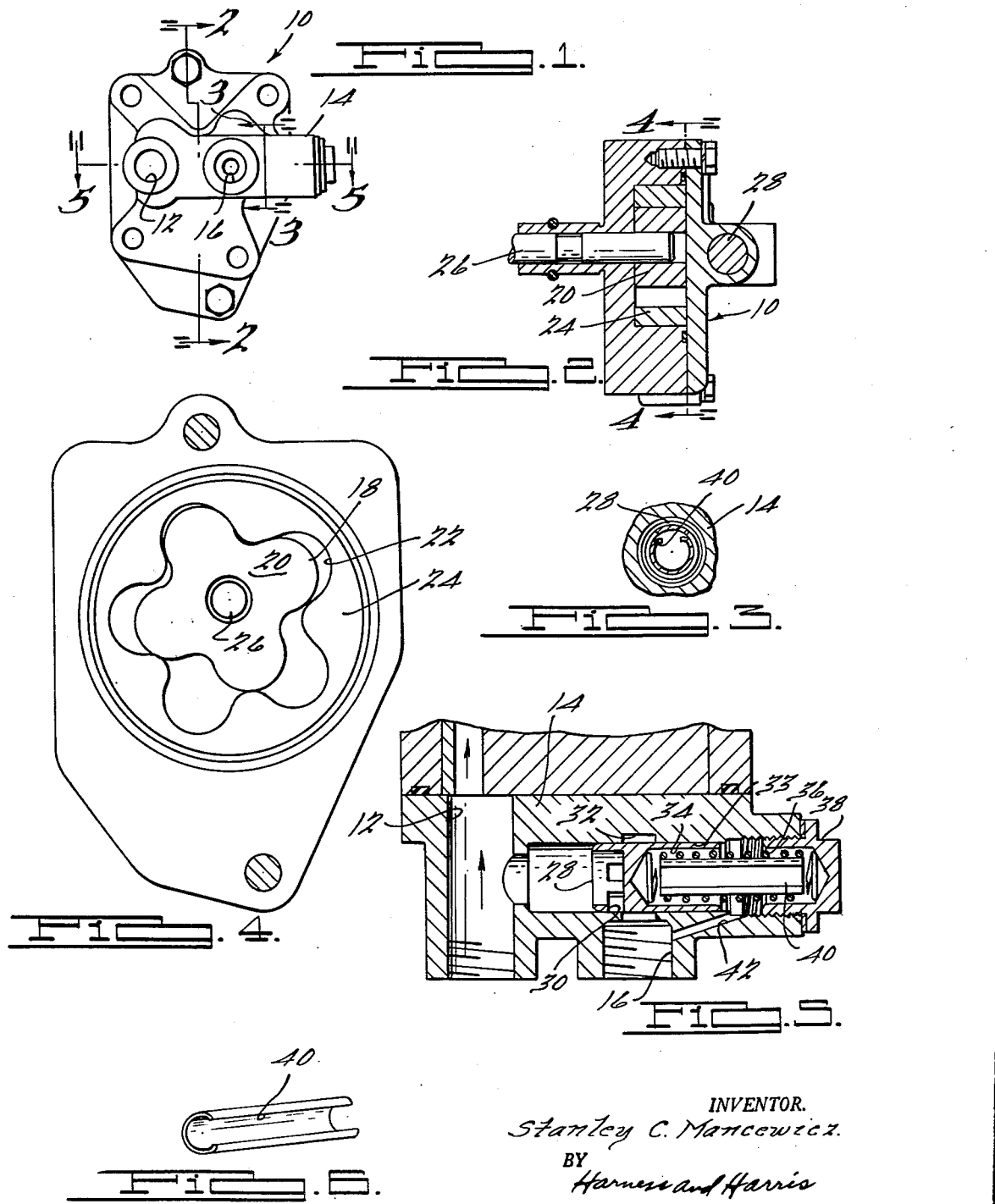

3,074,428
DAMPED PRESSURE RELIEF VALVE
Stanley C. Mancewicz, Birmingham, Mich., assignor to Chrysler Corporation, Highland Park, Mich., a corporation of Delaware
Filed Oct. 21, 1960, Ser. No. 64,146
4 Claims. (Cl. 137—514)

This invention relates to improvements in pressure relief valves which find utility in preventing excessive pressures within lubricating systems of the type, for example, employed in automotive engines. The improvements herein are primarily concerned with the prevention of excessive noise caused by certain undesirable reactions of the relief valve to oil pressure fluctuations.

Heretofore, pressure relief valves have been used in conjunction with pulsating discharge oil pumps in order to stabilize the discharge pressures within safe limits. A serious noise and wear problem has arisen from the use of the conventional pressure relief valves in that they are normally spring loaded and have, therefore, a natural harmonic period which is within frequency range of the pulsations of the oil pumps. Consequently, when the harmonic (natural) frequency of the valve is substantially matched by the pump pulsations, excessive movement of the resiliently mounted valve plunger occurs and considerable fluctuation in discharge pressure of the pump results.

In addition to alternately reducing and increasing the pump discharge pressure to values beyond a proper limit, the sudden reductions in pressure cause cavitation, particularly of hot lubricating oil, and subsequent increase in pressure causes the oil vapor bubble to collapse. The effects of the collapsing bubble and the abnormal fluctuations in pump discharge pressure is manifested in noise vibrations produced in the lubricating system due to the impingement of fluctuating forces of the oil against the lubricating system's components, for example, the relatively thin walled oil filter housing. This noise often attains a level which effectively disturbs the operator of the vehicle, and the pressure fluctuations further results in premature wearing of the parts of the lubricating system.

A principal object of this invention is to provide a pressure relief valve for use in pressurized lubricating systems which valve has an automatically operating damping means to reduce the effect of the pump discharge pulsations on the movement of the relief valve plunger.

This object is attained in the present invention by the use of a split sleeve frictionally engaging either the inner or outer diameter of the coil spring which resiliently urges the relief valve plunger toward its closed position. The effect of the sleeve is to convert the energy produced by the pump pulsations and transmitted to the spring into heat energy and prevent galloping of the valve plunger which would otherwise result from a coincidence of the frequency of the pump pulsations and the natural harmonic period of the spring.

Further objects and advantages of the present invention will become apparent from the following description and drawings, in which:

FIGURE 1 is an elevational view of the pump and pressure relief valve unit;

FIGURE 2 is a cross-sectional view of the unit of FIGURE 1 taken along the line 2—2 thereof in the direction of the arrows;

FIGURE 3 is a cross-sectional view of the unit of FIGURE 1 taken along the line 3—3 thereof and showing the relief valve in cross section;

FIGURE 4 is a cross-sectional view of the unit of FIGURE 2 taken along the line 4—4 thereof in the direction of the arrows;

FIGURE 5 is a longitudinal cross-sectional view of the conduit and relief valve structure of the unit of FIGURE 1 taken along the lines 5—5 thereof in the direction of the arrows; and FIGURE 6 is an isometric view of the vibration dampener.

Referring to the drawings, a combination pump and relief valve generally designated 10 is provided with a pump outlet 12, a pressure relief valve body 14, and a bypass or relief conduit 16 which may conveniently return to the pump inlet. The pump as shown in FIGURE 2 may be a conventional positive displacement gear type pump having lobes 18 on an inner rotor 20 which rotates eccentrically to progressively locate each of the lobes 18 into the sockets 22 in an outer rotor 24 in a conventional manner. The shaft 26 of the pump may be conveniently connected to any power source such as the engine camshaft. It is noted that the present relief valve finds utility in any system using a pump which produces pulsating output pressures.

As shown in FIGURE 5, the pressure relief valve comprises a plunger 28 having a plurality of circumferentially displaced ports 30 therein which coincide with a bypass groove 32 which opens into the bypass conduit 16, as the plunger is moved to the right in cylinder 33 as shown in FIGURE 5. The plunger is provided with a recess 34 in which a coil spring 36 is nested and held into place by a recessed threaded nut member 38. A dampener in the form of a split sleeve 40 is located inside of the spring 36 and frictionally engages the inner periphery of the spring coils. The frictional force with which the dampener is retained in the spring may be adjusted according to the degree of dampening required. A conduit 42 connects passage 16 with recess 34 so as to prevent oil which leaks past the plunger 28 into the cylinder 33 from locking the valve plunger against movement.

The dampener sleeve 40 as stated above may be frictionally secured to the outside of the spring as well as to the inside depending upon convenience of design. Moreover, the shape of the dampener 40 may be varied according to tolerance and design requirement since its main function is to convert the increased energy imparted to the spring to heat energy and thereby reduce the amplitude of vibrations of the excited spring.

I claim:

1. In a stabilizing valve for use in conjunction with a pulsating fluid output pressure, conduit means adapted to be connected with said pressure, valve means movable within said conduit means to regulate the fluid flow therethrough according to said pressure, a cylindrical coil spring yieldingly urging said valve means axially toward a predetermined position, and damping means having parallel axially extending sides yieldingly engaged frictionally by said spring means to damp the resilient movement thereof urging said valve means to said position and being freely floating with respect to both said valve and conduit means and being shiftable axially of said spring.

2. In a stabilizing valve for use in conjunction with a pulsating fluid output pressure, conduit means adapted to be connected with said pressure, valve means movable within said conduit means to regulate the fluid flow therethrough according to said pressure, a cylindrical coil spring yieldingly urging said valve means axially toward a predetermined position, and yieldable damping means having parallel axially extending positions gripped by said spring under tension to effect a frictional engagement between said damping and spring to damp the resilient movement thereof urging said valve means to said position, said damping means being spaced from and free of attachment with said plunger means and said conduit means.

3. In a stabilizing valve for use in conjunction with a pulsating fluid output pressure, conduit means adapted to be connected with said pressure, valve means movable within said conduit means to regulate the fluid flow therethrough according to said pressure, a cylindrical coil spring resiliently deformable axially and operatively engageable with said valve means for yieldingly urging said valve means axially toward a predetermined position, and damping means comprising an axially split sleeve member having parallel axially extending portions in frictional engagement with said spring, said spring and sleeve member being arranged coaxially, one within the other, in said frictional engagement to damp the resilient axial deformation of said spring.

4. The combination according to claim 3, said sleeve member being shiftable axially of said spring and being free of attachment with said plunger means and said conduit means.

References Cited in the file of this patent
UNITED STATES PATENTS

| | | |
|---|---|---|
| 997,296 | Isenberg | July 11, 1911 |
| 1,841,337 | Roessler | Jan. 12, 1932 |
| 1,928,678 | Sjolander | Oct. 3, 1933 |
| 2,338,760 | Deming | Jan. 11, 1944 |
| 2,801,801 | Gillick et al. | Aug. 6, 1957 |
| 2,833,374 | Glasser | May 6, 1958 |